United States Patent [19]
Gibson et al.

[11] Patent Number: 6,021,311
[45] Date of Patent: Feb. 1, 2000

[54] METHOD OF, AND SYSTEM FOR, TRANSMITTING MESSAGES

[75] Inventors: Rodney W. Gibson, Haywards Heath; Peter M. Relph, Roydon, both of United Kingdom; John R. Bell, Fremont, Calif.

[73] Assignee: U.S. Philips Corporation, New York, N.Y.

[21] Appl. No.: 08/975,383

[22] Filed: Nov. 20, 1997

[30] Foreign Application Priority Data

Dec. 6, 1996 [GB] United Kingdom .................. 9625373

[51] Int. Cl.$^7$ ...................................................... H04Q 7/00
[52] U.S. Cl. ..................................... 455/31.3; 340/825.44; 340/825.47; 370/515; 370/535; 370/342
[58] Field of Search .................................. 375/200, 202; 455/31.1, 31.3

[56] References Cited

U.S. PATENT DOCUMENTS

| | | | |
|---|---|---|---|
| 4,882,579 | 11/1989 | Siwiak | 455/31.3 |
| 4,940,963 | 7/1990 | Gutman et al. | 455/31.3 |
| 5,142,279 | 8/1992 | Jasinski et al. | 455/31.3 |
| 5,499,266 | 3/1996 | Yokev et al. | 375/202 |
| 5,872,522 | 2/1999 | Gibson | 375/200 |
| 5,881,092 | 3/1999 | Gibson | 375/200 |

FOREIGN PATENT DOCUMENTS

| | | | |
|---|---|---|---|
| WO8906407 | 7/1989 | European Pat. Off. | G08B 5/22 |
| WO9614716 | 5/1996 | WIPO . | |

*Primary Examiner*—Wellington Chin
*Assistant Examiner*—Blane Jackson
*Attorney, Agent, or Firm*—Jack D. Slobod

[57] ABSTRACT

A message transmission system includes at least one primary station arranged for making transmissions on a down-link and a plurality of secondary stations arranged for making transmissions on an up-link, each of the secondary stations having its own address which is transmitted as part of the down-link message. Each of the secondary stations is configured for generating responses to messages as pseudo-random data sequences, the pseudo-random data sequence being generated by a secondary station at any one time being dependent on at least the address assigned to the secondary station and/or information contained in the message.

13 Claims, 9 Drawing Sheets

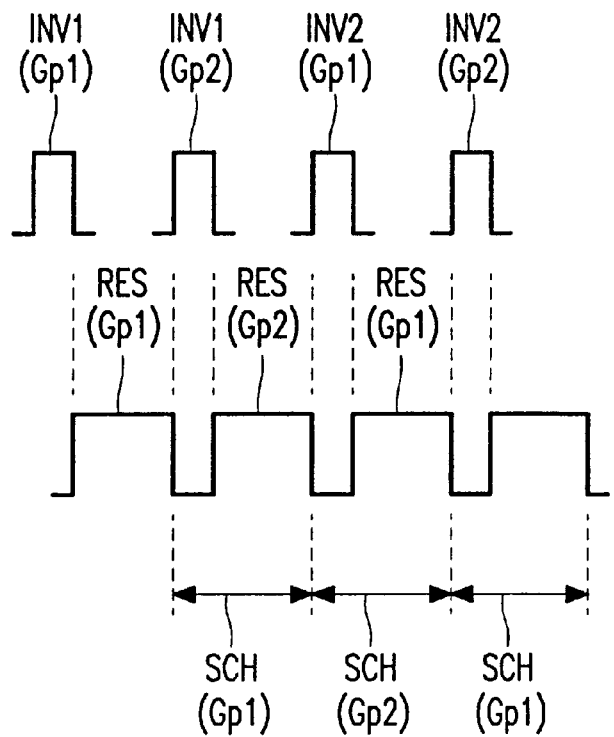
FIG. 3
| S | M1 | M2 | M3 | M4 | M5 | M6 | S | M7 | M8 | M9 | M10 | M11 | M12 | M13 | M14 |
FIG. 4A
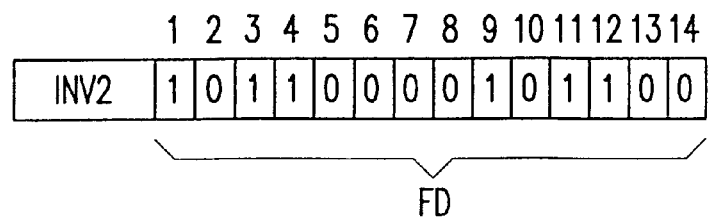
FIG. 4B

METHOD OF, AND SYSTEM FOR, TRANSMITTING MESSAGES

BACKGROUND OF THE INVENTION

The present invention relates to a method of, and system for, transmitting messages and also to a primary station and a secondary station for use in the system. An example of such a system is an answer back paging system and for convenience reference will be made to an answer back paging system but it is to be understood that the teachings of the present invention can be applied to other 2-way messaging systems.

Answer back paging systems have been disclosed for example in WO96/14716. In an elementary form such a system requires a paging network controller (PNC) to arage for a message to be transmitted to a predetermined addressee. The addressee on receivig a call is able transmit a simple reply by way of a low power transmitter incorporated into the pager. The above mentioned Patent Specification discloses a system in which a series of messages are transmitted to respective addressees and the PNC then transmits invitations for the addressees to transmit their replies substantially simultaneously as pseudo random data sequences which are de-spread at the PNC and the replies forwarded to the respective party requiring the reply. In order to avoid having to apply power control techniques in the pagers to ensure that replies at any one instant are received by the PNC at comparable power levels, the PNC transmits its invitations at stepwise increasing (or decreasing) power levels and only those pagers just able to receive a respective one of the invitations transmit their replies. A feature of this known method is that relatively strict control of the received power is necessary.

PCT Patent Application IB97/00492 discloses a variant of the above mentioned method which for convenience of description will be referred to as progressive elimination. In this technique the PNC transmits a series of messages on a downlink to individually addressed pagers. The PNC then transmits a control signal on the down-link inviting those pagers wishing to make an up-link transmission, for example a reply to a message, request for service or a registration request, to transmit them substantially simultaneously as pseudo-random data sequences. The PNC analyses those of the up-link transmissions which are intelligible and then repeats the invitation which includes acknowledgements of those up-link transmissions that have been analysed successfully, consequently only those pagers who had responded the first time but had not received an acknowledgement need retry.

Essentially these known techniques require each pager to store a number of pseudo-random data sequences, each one specific to a particular type of response. However this leads to some inflexibility when processing group messages, responding individually to several stored messages and fragmented messages.

OBJECTS AND SUMMARY OF THE INVENTION

An object of the present invention is to introduce more flexibility into the operation of answer back messaging systems.

According to one aspect of the present invention there is provided a method of operating a message transmission system comprising at least one primary station making transmissions on a down-link and a plurality of secondary stations making transmissions on an up-link, each of the secondary stations having its own address which is transmitted as part of the down-link message, characterised in that up-link transmissions comprise pseudo-random data sequences, the pseudo-random data sequence being used by a secondary station being dependent on at least the address assigned to the secondary station and/or information contained in the message.

The transmissions on the up-link may comprise responses to messages sent on the down-link and/or requests for a service.

According to a second aspect of the present invention there is provided a message transmission system comprising at least one primary station having means for making transmissions on a down-link and a plurality of secondary stations having means for making transmissions on an up-link, each of the secondary stations having its own address which is transmitted as part of the down-link message, characterised in that said means in said secondary stations generates responses to messages, said responses comprising pseudo-random data sequences, the pseudo-random data sequence being generated by a secondary station at any one time being dependent on at least the address assigned to the secondary station and/or information contained in the message.

According to a third aspect of the present invention there is provided a secondary station for use in a message transmission system in which at least one primary station transmits messages on a down-link to addressed secondary stations, the secondary station having means for making transmissions on an up-link, characterised in that said means in said secondary stations generates a pseudo-random data sequence in response to a received message, the pseudo-random data sequence being generated at any one time being dependent on at least the address assigned to the secondary station and/or information contained in the message.

According to a fourth aspect of the present invention there is provided a primary station for use in message transmission system comprising at least one primary station having means for making transmissions on a down-link and a plurality of secondary stations having means for making transmissions on an up-link, said up-link transmissions comprising pseudo-random data sequences, characterised in that the primary station has means for receiving a message, encoding the message, appending an address of the secondary station, and compiling a plurality of messages into a message stream which is transmitted on the down-link, the primary station further comprising means for receiving up-link transmissions, decoding the up-link transmissions received, acknowledging those up-link transmissions received successfully and inviting those secondary stations not receiving an acknowledgement to repeat their up-link transmissions.

The present invention will now be described, by way of example, with reference to the accompanying drawings, wherein:

BRIEF DESCRIPTION OF THE DRAWINGS

FIG. 3 is a diagram showing the interlaced operation of a pseudo random data sequence response type of system, FIGS. 4A and 4B illustrate how acknowledgements are combined with an invitation signal transmitted on the down-link.

In the drawings the same reference numerals have been used to indicate corresponding features.

DETAILED DESCRIPTION OF THE PREFERRED EMBODIMENT

Figure 1:
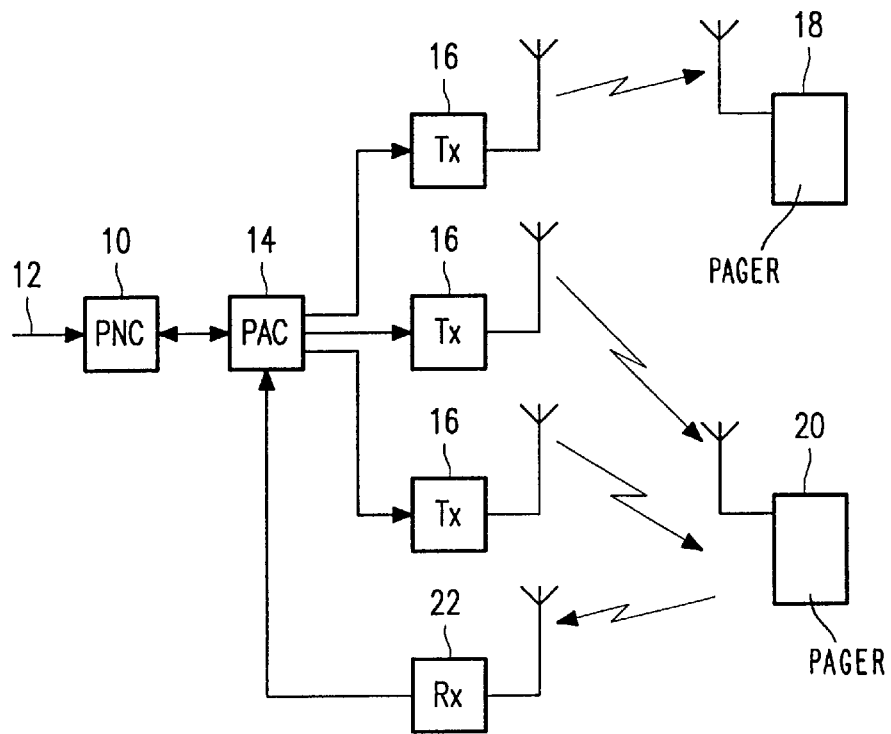
FIG. 1 is a block schematic diagram of a message transmission system.

Referring to FIG. 1, the message transmission system comprises a paging network controller (PNC) 10 having a message entry port 12 which receives pager addresses and associated messages from an operator equipped with a personal computer (PC) or directly from a subscriber having a PC and a modem. The PNC 10, which comprises directories containing information such as pager radio identity codes (RICs), areas to be paged, frequencies, pager types, prevailing protocols, for example POCSAG (or CCIR Radiopaging Code No 1) and ERMES, and status of the pagers, assembles the messages and their associated RICs together with other relevant information into data packets which are forwarded to a paging area controller (PAC) 14 which formats the RICs and associated messages into a format which can be transmitted by base station transmitters (or transmitter section of a base station transceiver) 16 to two-way pagers 18,20 respectively, by way of a down-link.

If a two-way pager 20 identifies that a message is being transmitted having its RIC, it receives the message and decodes it. If the user wishes to send a brief response then, by means of an integral key pad, he selects a pre-stored response and when invited by the PAC 16 it transmits its response by way of an up-link. The response signals may be sent simultaneously as pseudo-random data sequences (PRDS).

One or more receivers (or receiver sections of a transceiver) 22 are provided for receiving the responses and for relaying them to the PAC 14 in which they are decoded and sent as data packets to the PNC 10. The PNC 10 comprises means for analysing the signals and for matching the responses with the messages transmitted on the down-link.

Those responses which are matched are relayed to the respective users in any suitable form, for example by e-mail or by transmission as one-way paging messages. Alternatively the responses are sent to a message answering service operated by the paging network. In either case an acknowledgement is sent to the respective 2-way pager 20 However, not all the responses are matched because for example strong responses smother the weak responses as a result of the near-far effect. If the PNC 10 determines that only a small proportion of the messages transmitted on the down-link have received responses then it issues a general invitation to those pagers which have not responded to the messages or have not received an acknowledgement, to transmit or re-transmit their responses on the up-link. The newly received responses are analysed, matched where possible and acknowledgements are transmitted. If it is determined that the total number of successful responses is still below a statistically determined threshold level, the cycle is repeated by transmitting another invitation signal on the down-link. The process is repeated until either a predetermined number of cycles have elapsed or the threshold level has been exceeded and it is evident that no more intelligible responses to the batch of messages are recoverable.

In the case of substantially simultaneously transmitted PRDS response signals, each time a batch of response signals is received, those response signals which are analysed successfully will generally have the greatest power levels at the antenna of the receiver 22. Thus as they will be eliminated from the pool of response signals, then when the next invitation signal is transmitted, signals from weaker sources, that is, the more distant pagers, will be decoded and matched. This sequence of operations is referred to herein as Progressive Elimination.

Figure 2:
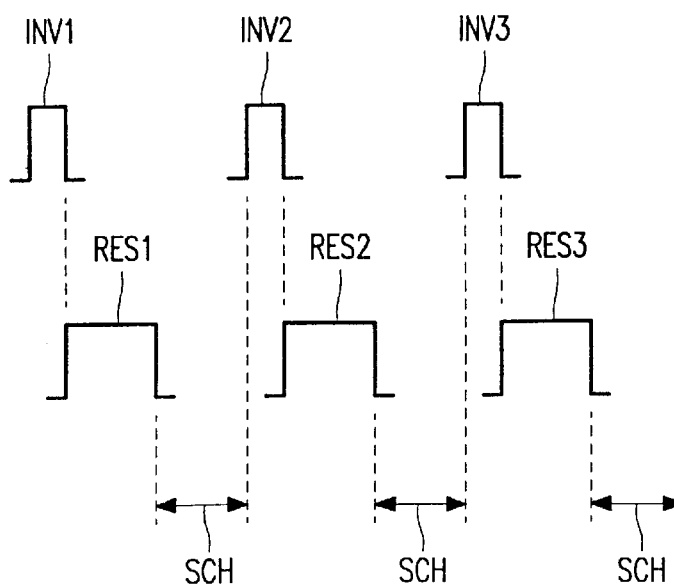
FIG. 2 is a diagram showing the transmission of invitation signals, reception of CDMA responses and the analyses of the responses

FIG. 2 illustrates an example of a system in which responses comprise PRDS signals which are transmitted simultaneously in response to an invitation signal on the down-link. In FIG. 2 messages (not shown) already have been transmitted on the down-link. A first invitation INV1 is transmitted on the down-link. The pagers which have detected a message addressed to them respond to the invitation signal INV1 by transmitting a code sequence within a defined time slot RES1. A search routine SCH is initiated following expiry of the time slot. In the search routine, codes stored in the PNC 10 (FIG. 1) are successively compared with the response data sequences and one by one the responses to particular ones of the messages are identified. However, due to the near/far problem only the strongest of the response signals are detected and these are eliminated from the next search by acknowledgement signals being transmitted on a down-link to inform those pagers which have been successful not to the respond to the subsequent invitation signals INV2 and INV3 in the sequence.

It is anticipated that in a practical system the majority of the pagers 18, 20 (FIG. 1) will be some distance from the antenna(s) of the receiver(s) 22 which means that they will have a low power at the antenna. Accordingly, although the durations of the time slots RES1, RES2 and RES3 may be equal, as shown, it is preferable that variable slot lengths be allocated according to the anticipated number of responses, for example a low number of relatively high powered responses and a high number of relatively low powered responses. Short slots are allocated initially so that the few, strong powers contending against low noise and interference can be eliminated efficiently. Longer slots are then allocated to accommodate the weak received powers contending against significant levels of noise and interference.

If desired the pagers 18, 20 may have power control on their transmitters in order to vary the strength of their response signals and in so doing reduce the number of invitation/response cycles.

In a refinement of the embodiment described with reference to FIG. 2, FIG. 3 shows dividing the population of the pagers into two groups and interleaving the transmission of messages and invitations for one group Gp1 on the down-link with analysing the responses on the up-link from the other group Gp2.

One method of dividing the pager population is to assign the odd numbered pagers to one group, say Gp1, and the even numbered pagers to a second group, say Gp2. An alternative method is for the pagers to measure the strength (RSSI) of the received down-link signal and by using a pre-set threshold determine to which one of say two groups they belong.

One method of issuing an invitation message whilst simultaneously informing those pagers whose responses have been analysed successfully is to send the messages M1 to M14 in an ordered sequence as shown in FIG. 4A and in the invitation signal, FIG. 4B, providing a field FD with a corresponding number of time slots on a 1 to 1 basis, thus slot 3 corresponds to message M3. When the first invitation signal INV1 is transmitted, say all the bits in the field FD are zero indicating that no responses have been received. However, after the first round of analyses, acknowledgements are transmitted to say the pagers to which the messages M1, M3, M4, M9, M11 and M13 were addressed by changing the bits in slots 1, 3, 4, 9, 11 and 13 of the field FD from "0" to "1". Further bits are changed as more of the messages are acknowledged.

The number of cycles in which invitations are transmitted may be fixed. However, if it is determined that the number of successfully decoded responses exceeds a statistically determined threshold value, then further iterations are stopped.

Figure 5:
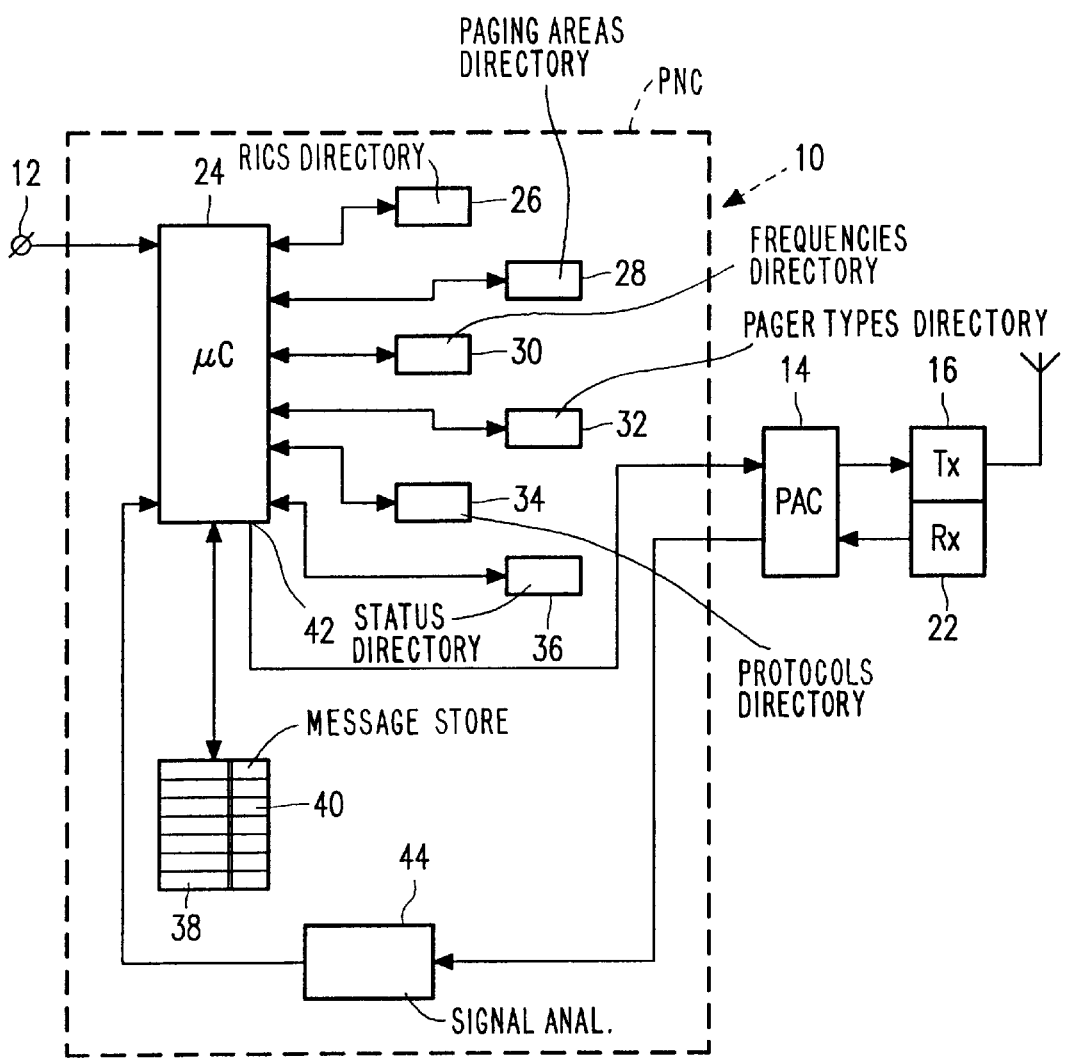
FIG. 5 is a block schematic diagram of the PNC 10.

FIG. 5 shows in block schematic form a PNC 10 coupled to a PAC 14 and a base station transmitter 16 and a receiver 22. The entry port 12 is coupled to a microcontroller 24 to which are connected directories 26 to 36 relating respectively to RICs, paging areas, frequencies, pager types, prevailing protocols and status. A message store 38 is coupled to the microcontroller 24 for storing messages as they are received at the entry port 12. The store 38 has an area 40 for storing indications confirming that a response to a respective message has been received and acknowledged. An output 42 from the microcontroller 24 is coupled to the PAC 14 to supply data packets to be formatted prior to being transmitted by the transmitter 16.

Responses received by the receiver 22 are relayed to a signal analyser 44 by way of the PAC 14. As each response is analysed successfully, it is forwarded to the microcontroller 24 for matching with the messages in the store 38. Once matched, the microcontroller arranges for an acknowledgement to be transmitted when sending the next invitation signal on the down-link. At the appropriate moment the recipients of the responses are informed, for example by e-mail or a one-way paging message, or the responses are stored together with the respective pager number so that a subscriber can interrogate the store at his or her convenience. Once the microcontroller 24 has decided that for all practical purposes all the responses have been received, it erases the messages in message store 38 in readiness for receiving more messages by way of the entry port 12. More conveniently the store 38 can comprise two halves with one half handling the acknowledgements of the messages already sent on the down-link and the other half storing messages to be sent.

Figure 6:
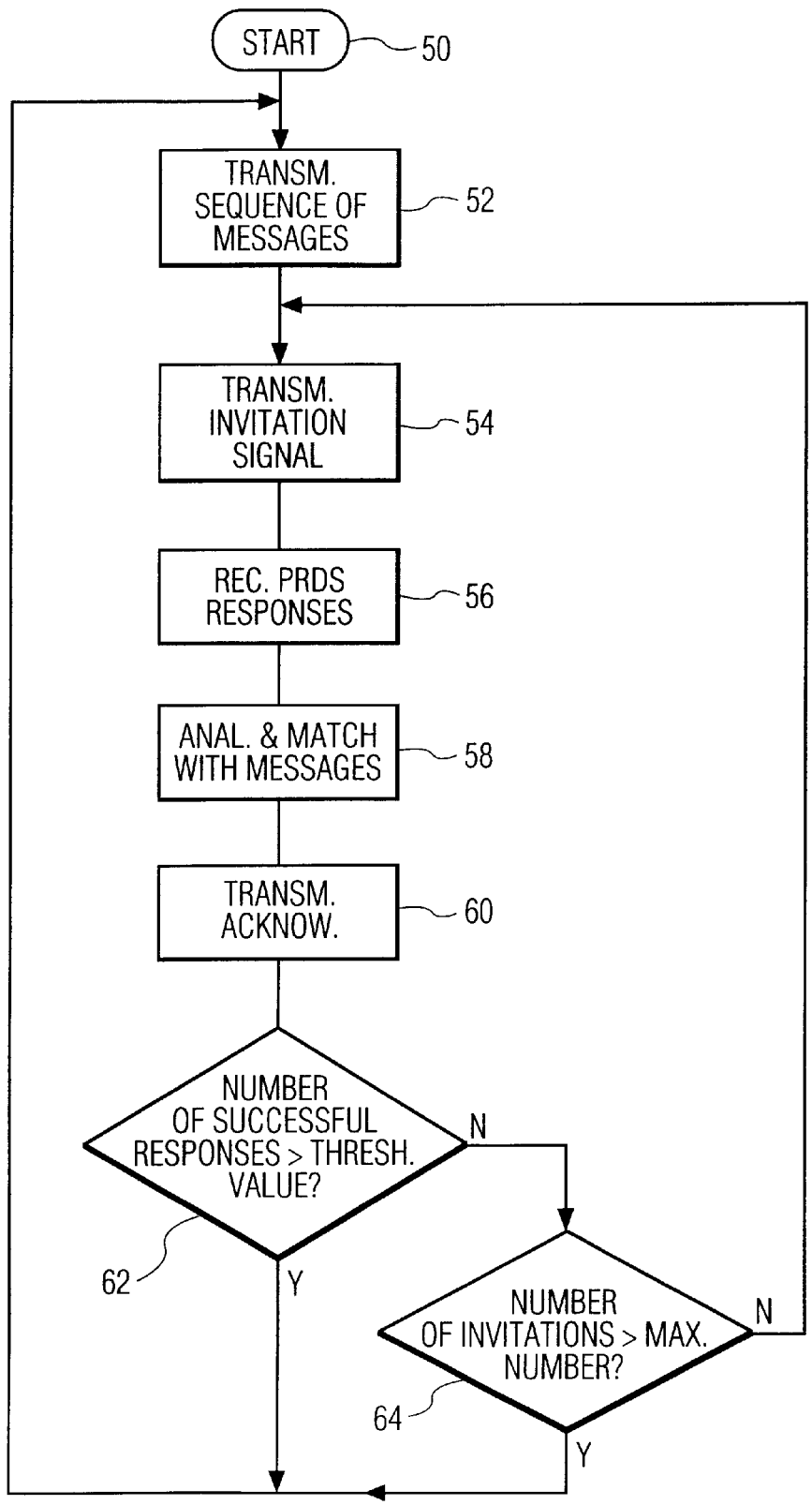
FIG. 6 is a flow chart showing the sequence of operations.

FIG. 6 is a flow chart showing the sequence of operations involved in transmitting messages, receiving responses and acknowledging responses. Block 50 represents start. Block 52 relates to the transmission of a sequence of messages and this is followed in block 54 by the transmission of an invitation signal. Block 56 relates to the reception of the PRDS responses which are then analysed and matched with their respective messages in block 58. Block 60 relates to the transmission of the acknowledgements. In block 62 a check is made to see if the number of successful responses exceeds a threshold value indicating that as many as possible responses have been received. If the answer is No(N) the flow chart proceeds to block 64 in which a check is made to see if the predetermined maximum number of invitations has been exceeded. If the answer is No(N) the flow chart reverts to the block 54. A Yes(Y) answer from the blocks 62 and 64 causes the flow chart to revert to the block 52 and the cycle is repeated.

Figure 7:
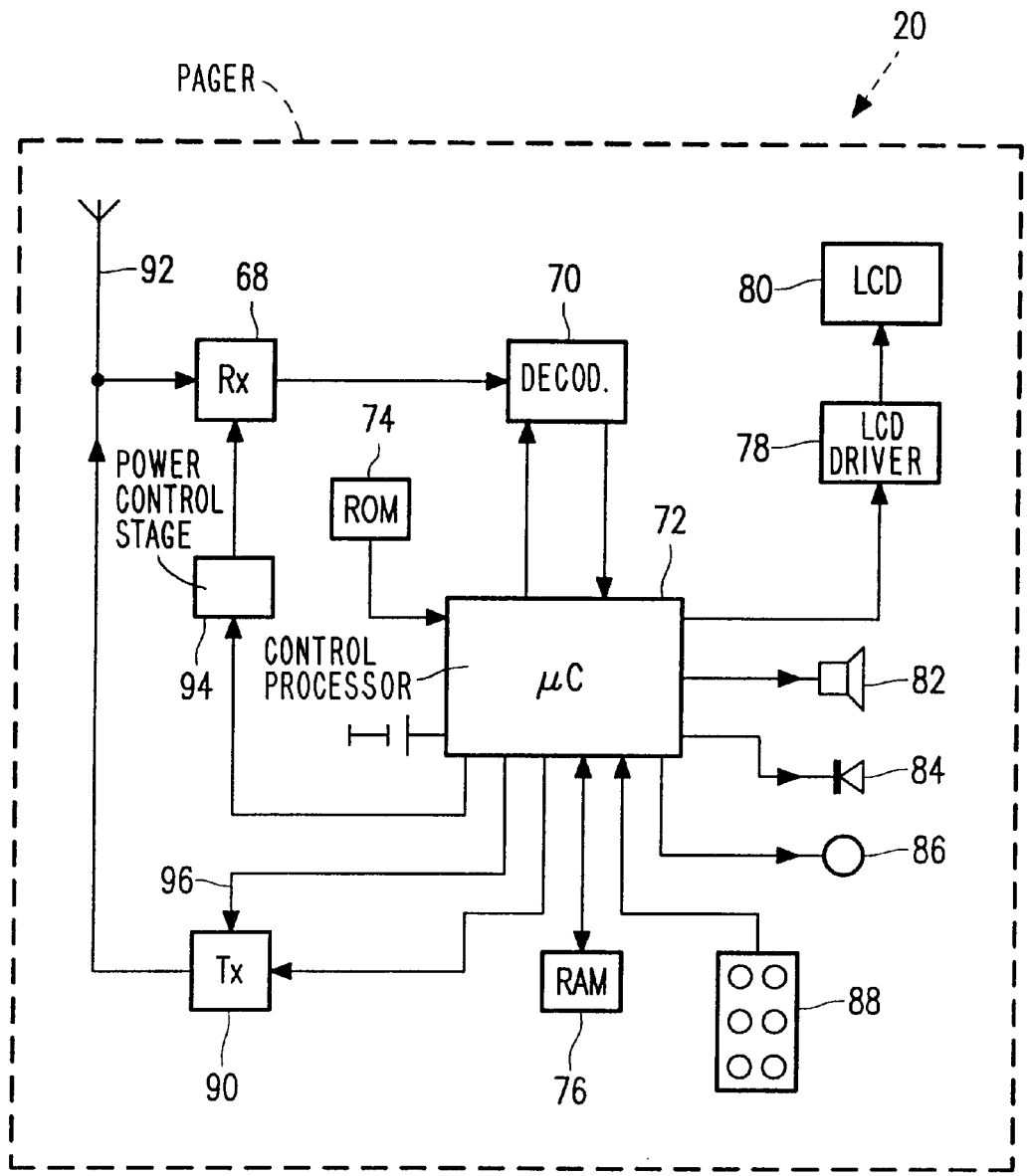
FIG. 7 is a block schematic diagram of a pager.

Referring to FIG. 7, the pager 20 comprises a receiver 68 connected to a decoder 70 which in turn is coupled to a control processor 72. The processor 72 operates in accordance with a program stored in a read-only memory 74. The processor also includes an address store (not shown) which contains the unique addresses of that pager. In the event of the pager receiving a message then this is stored in a random access memory 76. The messages can be displayed subsequently on a LCD panel 80 which has its associated driver 78 coupled to the control processor 72. Annunciating devices which may comprise an acoustic transducer 82, a light emitting transducer 84 and a vibrator 86 are coupled to the control processor 72. A keypad 88 provides a man machine interface whereby a user can instruct the processor to carry out various functions, for example to display a stored message on the panel 80. A transmitter 90 is coupled to an output of the processor 72 and to an antenna 92. A receiver power control stage 94 is coupled between the processor 72 and the receiver 68 in order to practice battery conservation in accordance with the provisions of the paging protocol being followed. In the event of the pager sending response signals as PRDS signals then the control processor 72 comprises means for determining the sequence to be transmitted having regard the identity of the pager and/or information in the original down-link message. The PRDS is then relayed to the transmitter 90 for onward transmission. If as an option power control is to be applied to the transmitter 90 then a power control signal is supplied by the processor 72 through a control line 96.

Further the signals transmitted on the up-link may also comprise requests for services, such as registration, and accordingly the present invention is equally applicable to processing such requests for services in the same way as a response with the exception there will be no match with an outgoing message.

Figure 8:
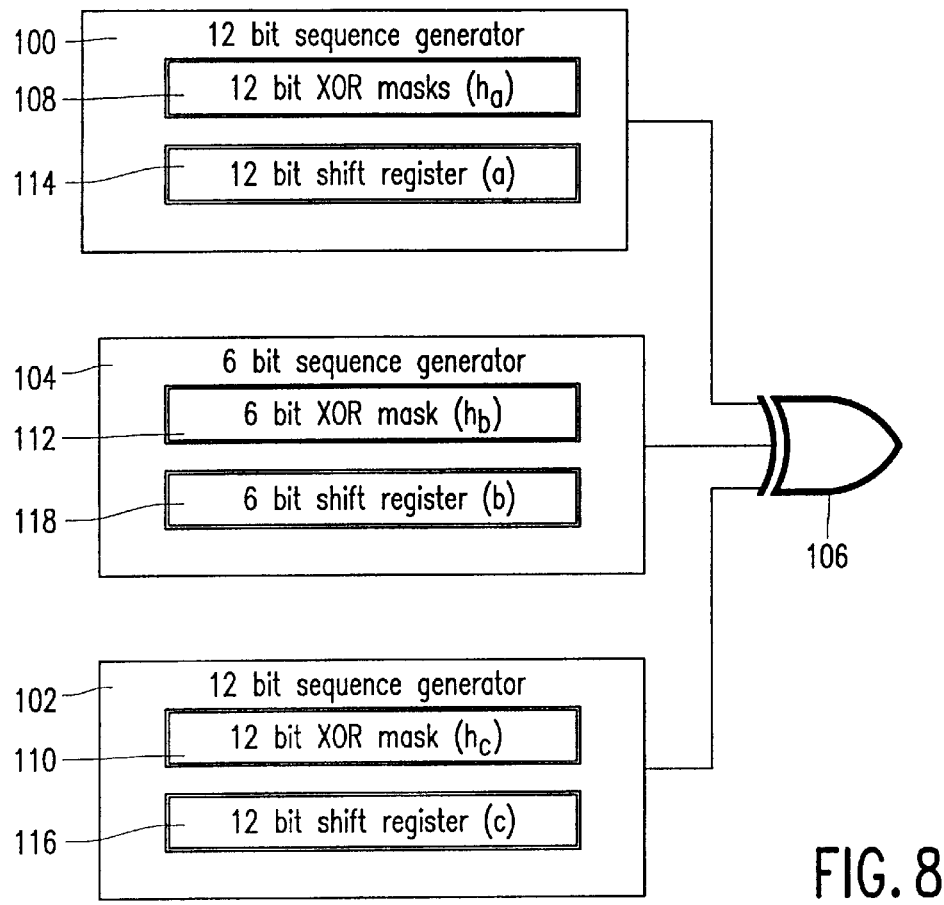
FIGS. 8 and 9 are block diagrams illustrating an embodiment of a means for generating a pseudo-random data sequence.

The method of determining the up-link PRDS enables a greater flexibility to be obtained when responding to down-link messages. Referring to FIG. 8 a response PRDS is generated using two 12-tap linear feedback shift registers 100, 102 and one 6-tap linear feedback shift register 104, the outputs of which are coupled to an exclusive—OR (XOR) gate 106. Each shift register comprises an n bit XOR mask 108, 110, 112 and an n-bit shift register 114, 116, 118, where n=12 for sequence generators 100, 102 and n=6 for sequence generator 104. All the sequence generators 100, 102, 104 are clocked together.

Figure 9:
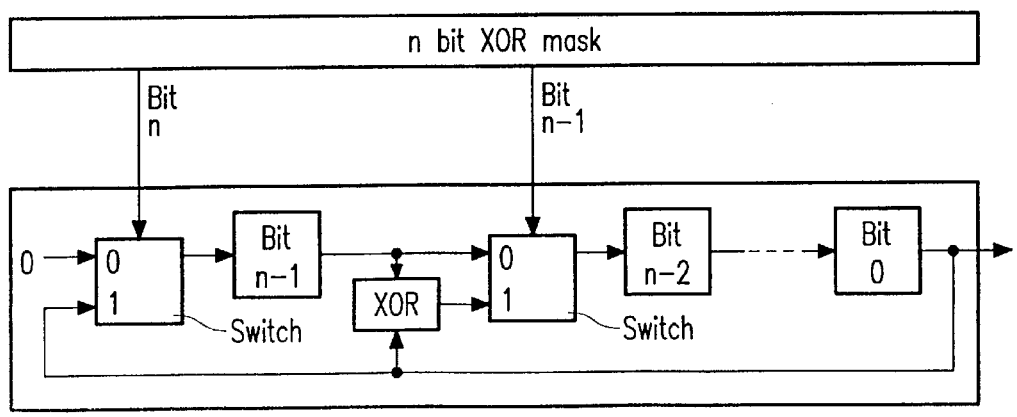

FIG. 9 illustrates an example of a n-bit sequence generator which is known per se and accordingly will not be described in detail.

In the present example, the default parameters $h_a$, $h_b$ and $h_c$ of the masks 108, 112 and 110, respectively, are $829_h$, $30_h$ and $B64_h$, respectively, and those of the shift registers 114, 118 and 116, viz a, b and c, are $001_h$, $([X]DIV2^N)DIV2^{12}$, and $([X]DIV2^N)MOD2^{12}$, where the subscript "h" represents hexadecimal, [X] refers in the POCSAG Standard to the 21 bit address and frame of the pager's RIC and [N] is an operator defined constant between 3 and 7 inclusive. The default phase is determined by $(2^2 DIV 2^N) \times ([X] MOD 2^N)$. In the following description the following parameters along with their default values are required by the pager.

They are explained in more detail in the subsequent description:

Phase Step: 8

Transmit: Enabled

Prior to transmission, pagers are required to initialise the sequence generator to the given phase. Note that phase zero of a sequence corresponds to the register as initially loaded. Phase n is achieved by clocking the registers n times. If directed, pagers may use different parameters.

Note that parameters '$h_a$', '$h_b$', and '$h_c$' define the P.N. family. All pagers in a given system shall use the same family. Parameters 'b' and 'c' define the code sequence. An Answerback Code refers to both the Sequence and the Phase.

Figure 10:
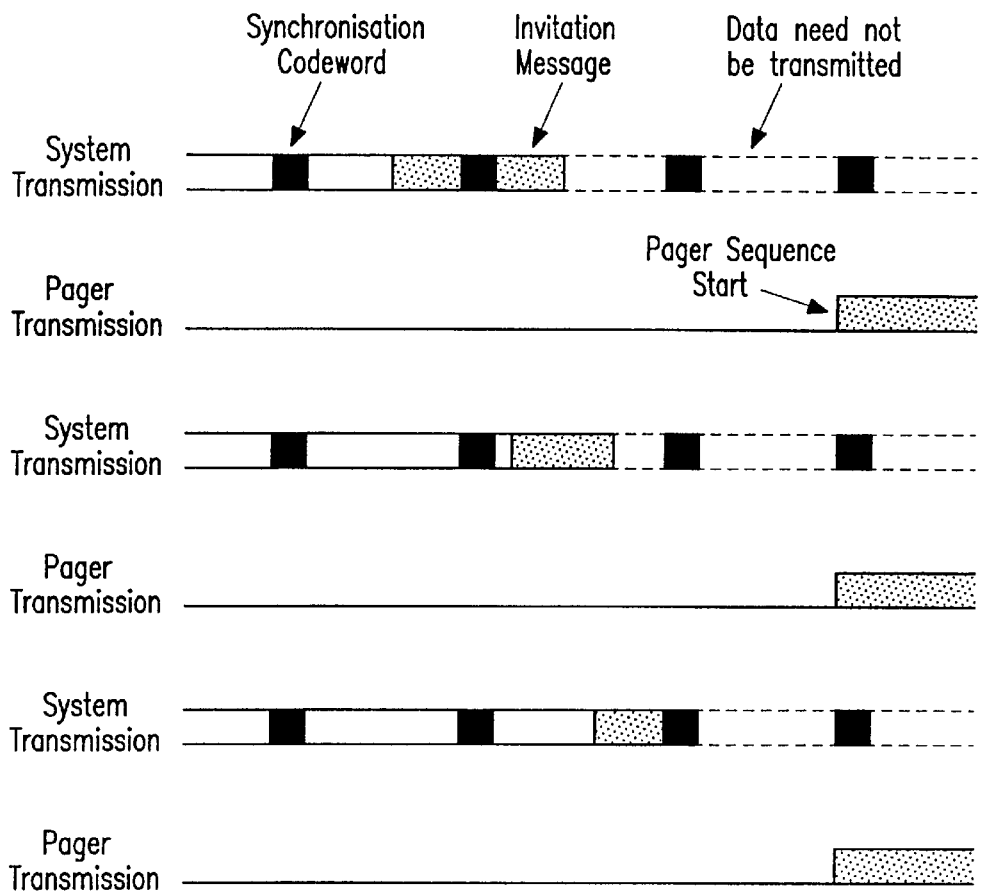
FIG. 10 is an example of the sequence timing rules.
Figure 11:
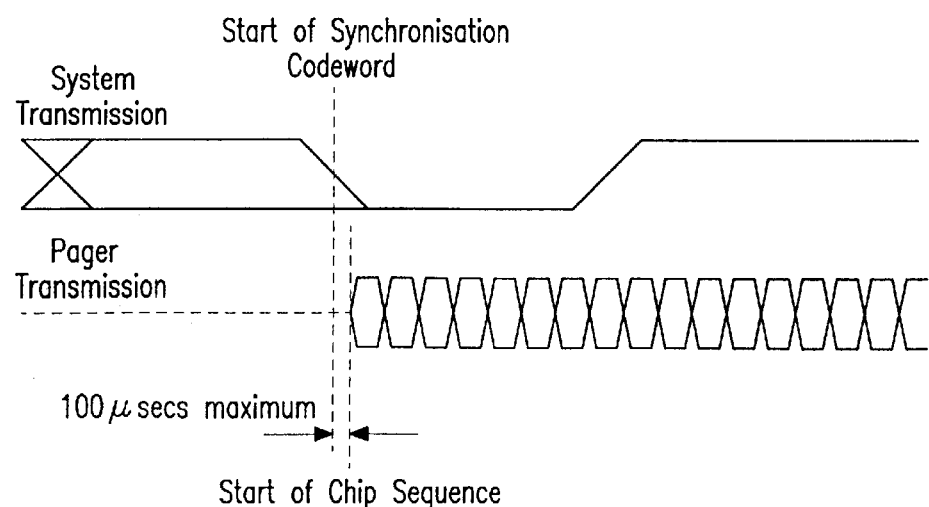
FIG. 11 is an example of a chip timing sequence.

When transmission is required the sequence generator is clocked to generate the chip sequence. The point in time where clocking is required to start shall be in accordance with the following rules:

i. Pagers only respond after receipt of an Invitation Control Sequence ICS ii. The transmit sequence shall start at the point where the beginning of the second synchronisation codeword following the end of the invitation message is due. Examples of this are shown in FIG. 10.

iii. The first bit of the transmit sequence shall commence as the first bit of the synchronisation codeword begins as shown in FIG. 11. Tolerance for this shall be ±100 microseconds.

iv. Transmission length is determined by the Invitation Command Sequence. Registers are clocked L times, where L is specified by the [Length] parameter in the Invitation Control Sequence.

v. The chip rate of the code sequence shall be 9600 chips per second with a tolerance of 10 ppm.

Prior to modulation, the chip sequence generated shall be filtered such that the total interference in the adjacent 25 kHz channel is −50 dBc.

In the following, two way command sequences will be described.

The basic principles are as follows:

Pagers only transmit in response to an invitation sent by the paging PNC system. More than one pager may transmit at a time as each pager uses a different sequence. Pagers do not need to be pre-programmed with special return channel RICs or other information.

Pagers use Control Sequences that are embedded in POCSAG (or CCIR Radiopaging Code No. 1) messages to determine how to respond and when. Control Sequences are sent as part of a normal text message to the user, and some can be sent on their own as a special pager message.

Characters are defined in one of two ways as follows:

<Value$_h$>: ASCII character in hexadecimal format. The valid range is from <00$_h$> to <7F$_h$>.

"Character": ASCII character as displayed.

For example "A" and <41$_h$> define the same character. Note that in accordance with the POCSAG standard, the least significant bit of each character is transmitted first.

Control Characters are any character from <00$_h$> to <1F$_h$> inclusive and <7F$_h$>. Printable characters are any other character.

Table 1 summarises the Control Sequences and these commands are defined in detail subsequently. Control sequences received incorrectly, or sequences incorrectly structured must be ignored by the pager.

Note that of these sequences, only three (the invitation, the response allocation, and the fast invitation control sequences) are essential for efficient two-way communication. All other control sequences provide various enhancements. For operators who wish to implement automatic Acknowledgements only, only the fast invitation control sequence is required.

TABLE 1

Forward Channel Reply Control Sequences

| Control Sequence | Abbreviation | Character | Description |
| --- | --- | --- | --- |
| Essential | | | |
| Invitation | ICS | I | Causes one or more pagers to send a response |
| Response Allocation | RACS | T | Defines unique response parameters for the pager. |
| Fast Invitation | FICS | F | A combination of the ICS and RACS for Acknowledgements only. |
| Useful | | | |
| Embedded Answer | EACS | R, r | Embedded answer to message/Canned dictionary to use. |
| Restore Defaults | RDACS | D | Use defaults. |
| End of Command | EOC | E | Indicates the end of a command. |
| Temporary Sequence Allocation | TSACS | X | Allocates a temporary Sequence to the pager. |
| Temporary Phase Allocation | TPACS | Z | Allocates a temporary Phase to the pager. |
| Transmit Inhibit/ Enable | TEICS | A, a | Allows an operator to inhibit or enable pager transmission. |
| Rare | | | |
| Temporary P.N. Family Allocation | TPFACS | Q | Allocates a temporary P.N. Family to the pager. |
| Permanent P.N. Family Allocation | PPFACS | P | Defines a P.N. Family for the pager. |
| Permanent Sequence Allocation | PSACS | W | Defines a Sequence for the pager. |
| Permanent Phase Allocation | PPACS | Y | Defines a Phase that should be used by the pager. |
| Phase Step Allocation | PSDCS | S | Defines the valid set of phase shifts permitted for use. |

The Invitation Control Sequence ICS defines how a pager should respond. The ICS can be sent to an individual pager, or to a group of pagers. The ICS is used in conjunction with the Response Allocation Control Sequence RACS.

A Fast Invitation Control Sequence FICS may be sent instead of a RACS/ICS pair.

Pagers send a response immediately.

The Invitation Control Sequence ICS defines for the pager the following:

The type of answers that are permitted.

A reference parameter.

A slot number which is used when implementing the Progressive Elimination technique described previously.

The following are optional parameters:

The length of time pagers are to transmit.

A time stamp.

Some recognition bits. When Progressive Elimination is used pagers use these bits to determine if their transmission was received, and if re-transmission is required.

The Invitation Control Sequence ICS has the following format:

<1E$_h$> 'I' [Type][ReflCS][Slot]{[Length]}{[Time]}{ [REC]} where:

| | |
|---|---|
| [Type] | Defines what type of Answerback responses are permitted from pagers, and which optional parameters are to be used. [Type] can be a value between <20$_h$> and <5F$_h$> inclusive. It shall be interpreted as a 6 bit number as follows.<br>If bit 5 is set: Solicited Response Invitation<br>bit 0     Acknowledgements. If this (least significant) bit is set, the pager may send an acknowledgement response.<br>bit 1     Displayed responses. If this bit is set, the pager may send a displayed response.<br>bit 2     User answer ready response to a specific message. If this bit is set, the pager may send a specific user answer ready response.<br>bit 3     User answer ready response to any message. If this bit is set, the pager may send a general user answer ready response.<br>bit 4     User answer responses. If this bit is set, the pager may send actual answers to a message.<br>If bit 5 is clear. Unsolicited Response Invitation<br>bits 0 to 4   Unsolicited Response Number (URN), where bits 0 to 4 define a 5 bit number between 0 and 31 inclusive.<br>Solicited and unsolicited responses are described later. |
| [ReflCS] | Defines a unique identity to the invitation. [ReflCS] is a single character that may have one of 95 values between <20$_h$> and <7E$_h$> inclusive. This enables pagers to keep track of series and related Invitation Control Sequences ICSs.<br>Pagers may only transmit Acknowledgements to a message when [ReflCS] matches [RefRACS] in the RACS. For other types of responses to a message, a time-limit is specified in the [Time] parameter in the Response Allocation Control Sequence RACS. |
| [Slot] | This is used to implement Progressive Elimination, and defines the Invitation Control Sequences ICSs of the series. [Slot] is a single character between 30$_h$ and 3F$_h$ inclusive. Its value is determined from the least significant 4 bits. If Progressive Elimination is not to be used, then it always contains 0 (<30$_h$>). |
| {[Length]} | A parameter that is not present if [Type] is <20$_h$>. Defines the number of times the sequence generator in the pager should be clocked, L, as follows:<br>bit 4 and bit 5 set:   L = 2$^N$, where N is a number between 0 and 15 inclusive defined by bits 0 to 3.<br>bit 4 clear, bit 5 set: L = 3 × 2$^N$.<br>bit 4 set, bit 5 clear: L = 5 × 2$^N$.<br>bit 4 and bit 5 clear: L = 75 × 2$^N$. |
| {[Time]} | A parameter that is not present if [Type] is <20$_h$> or <21$_h$>. It contains 3 characters with the following format: dhm; d has one of 31 day values from 1 to 31: h has one of 24 hour values from 0 to 23; m has one of 60 minute values from 0 to 59; In all cases these values are determined from the least significant 6 bits of the character sent, where characters between <20$_h$> and <5F$_h$> are used. It defines the current time.<br>Alternatively if [Time] is 'i' (<69$_h$>) pagers use their own internal clock to determine the present time. |
| {[REC]} | This parameter is not present if [Slot] is 0 (<30$_h$>). It contains recognition bits that inform pagers that responses were received by the paging system. The use of this parameter is described later. |

This command must terminate the message.

The Response Allocation Code Sequence RACS is always sent embedded in a message, and defines a message as requiring a response. It may be sent to a single pager or to a group of pagers. Note that pagers do not transmit a response until an ICS has been received.

The definition of the ICS and RACS as separate control sequences ensure that if required, a number of pagers transmit their responses at the same time.

The RACS defines for the pager the following:

A Type parameter. It restricts the type of responses permitted for the message, and defines which optional parameters are to be used.

The following are optional parameters:

A Reference parameter. This is used in conjunction with the reference parameter in the ICS.

A time stamp to limit non-Acknowledgement responses.

The Allocated Response Bit ARB to be used for the current message.

This is used to implement Progressive Elimination, and is used in conjunction with the [REC] parameter in the ICS to enable a pager to determine if a response is required or if a previous response was received.

A time stamp for the ARB.

An Answerback Code to use for the message.

The Response Allocation Code Sequence RACS has the following format:

<1E$_h$>'T'[Type]{[RefRACS]}{[Time]}{[ARB]}{ [TimeARB]}{[Code]}

| | |
|---|---|
| [Type] | Restricts pagers to provide only a subset of responses to the message. [Type] is one character that may have a value between <20$_h$> and <5F$_h$> inclusive. It shall be interpreted as a 6 bit number as follows:<br>bit 0   Acknowledgements. If this (least significant) bit is set, the pager may send an ACK response to this message.<br>bit 1   Displayed responses. If this bit is set, the pager may send a DISP response to this message.<br>bit 2   User answer ready response to a specific message. If this bit is set, the pager may send ANR, FLG or ANSn responses to this message.<br>bit 3   Allocating REC Bit. If set, [ARB] is included in the RACS.<br>bit 4   Separate time-out for ARB. If set, [TimeARB] is included in the RACS. It may only be set if bit 3 is set.<br>bit 5   Code present. If set, [Code] is included in the RACS. |
| {[RefRACS]} | A parameter that is only present if bit 0 of [Type] is set. It defines a unique identity for the response. It is a single character that may have one of 95 values between <20$_h$> and <7E$_h$> inclusive.<br>Pagers may only transmit Acknowledgements to a message when [RefRACS] matches [ReflCS] in the ICS. For other types of responses to a message, the time-limit specified in the [Time] parameter is used. |
| {[Time]} | A parameter that sets a time-limit for pager transmissions that are not Acknowledgements. This parameter is not present if both bits 1 and 2 of the [Type] parameter are clear.<br>Responses cannot be sent to messages outside this time-limit. The time limit is specified in one of two ways - by use of a time stamp or by use of the pagers internal clock. If a time stamp is used, [Time] is identical in format to the ICS [Time] parameter. Its contents are the current time, plus the required invitation window. Responses can only be made to messages when the ICS [Time] parameter is less than that in [Time].<br>If the pager's internal clock is to be used then [Time] is a single character from <60$_h$> to <7E$_h$> inclusive. Responses can only be made for the message for the next [Time] with the following meanings: <60$_h$> to <6F$_h$> time limit in minutes using least significant 4 bits; <70$_h$> 30 minutes; <71$_h$> 60 minutes; <72$_h$> 120 minutes; <73$_h$> 180 minutes; <74$_h$> 360 minutes; <75$_h$> 12 hours; <76$_h$> 24 hours; all |

-continued

| | |
|---|---|
| | other values reserved.<br>For example if [Time] is 'e' (<65$_h$>), then pagers can only send responses to messages over the next 5 minutes.<br>If [time] is 'JF!' (<4A$_h$><46$_h$><21$_h$>) then pagers can can only send responses to messages when the ICS contains a time stamp before 0633 on the 10th of the month. |
| {[ARB]} | This parameter is only present if bit 3 of [Type] is set and defines a REC bit for the pager.<br>For calls to a single pager: This parameter contains two hexadecimal characters that each have a value between '0' and '9', 'A' and 'F'; inclusive. Together they make a 2 digit hexadecimal number in the range of '00' to 'FF'.<br>For calls to a group of pagers: This parameter contains three characters 'Gn$_1$n$_2$', where n$_1$n$_2$ are two hexadecimal characters that each have a value between '0' and '9' 'A'and 'F' inclusive. Together they make a 2 digit hexadecimal number in the range '00' to 'FF'.<br>Alternatively it may contain one character 'L'. This instructs pagers to use the previous value of [ARB]. |
| {[TimeARB]} | This parameter is only present if bit 4 of [Type] is set. The format of the contents of this parameter are identical to that in [Time]. It defines the time-limit that applies to [ARB]. If this parameter is not present:<br>if [Time] is present, it defines the time-limit that appiies to [ARB].<br>otherwise [ARB] applies only when [RefRACS] matches [ReflCS] in the invitation Control Sequence ICS. |
| {[Code]} | This parameter is only present if bit 5 of [Type] is set. This parameter defines the code to be used by the pager for all responses to this message only. It may be used instead of the Temporary Sequence Allocation Control Sequence TSACS and Temporary Phase Allocation Control Sequence TPACS.<br>[Code] contains 2, 3 or 5 characters formatted as follows:<br>2 characters: [Phase]<br>3 characters: [Init b][Init c]<br>5 characters: [Init b][Init c] [Phase]<br>where |
| [Init b] | Contains one character. The least significant 6 bits define the 'b' 6 bit initialiser. Bit 7 is ignored and may have any value. |
| [Init c] | Contains two characters. The least significant 6 bits of each character together define the 'c' 12 bit initialiser. The first of the two characters contain the most significant 6 bits, the second the least significant. In both characters bit 7 is ignored and may have any value. |
| [Phase] | Contains two characters. The least significant 6 bits of each character together define a 12 bit number between 0 and 4095. The first of the two characters contain the most significant 6 bits, the second the least significant. In both characters bit 7 is ignored and may have any value. |

This command requires a delimiter as the length of the RACS is not known.

The Fast Invitation Control Sequence FICS is a combination of the Invitation Control Sequence ICS and the Response Allocation Control Sequence RACS, and can be sent to an individual pager, or to a group of pagers. Pagers may send a response immediately.

The FICS has the following format:

<1E$_h$>'F'[Length]

where [Length] is identical to that in the ICS command.

Note that the FICS is equivalent to the following ICS and RACS:

<IE$_h$>'I'<21$_h$>[Ref]<30$_h$>[Length]<1E$_h$>'T'<41$_h$>[Ref]

where [Ref] is any character. It is limited to Acknowledgment responses only and cannot be used to implement Progressive Elimination This command does not require a delimiter as the length of the FICS is known.

The Embedded Answer Control Sequence (EACS) is used to enable a user to give an answer to a message. The EACS may only be sent in the same message as the RACS and only applies to that message.

Two forms of embedded answer are supported. In the first, actual reply messages are sent embedded within the message. In the second, a pre-defined dictionary of responses is specified. In this case only one EACS may be transmitted in the message.

These forms must be used exclusively. A message may contain an EACS of either form, but may not contain an EACS of both forms.

In the first form, the EACS has the following format:

<1E$_h$>'R'[Answer]

| | |
|---|---|
| [Answer] | Is any string using printable characters. Characters that are not in the range <20$_h$> to <7E$_h$> inclusive are not permitted. |

This command is delimited with the control character of any command that may follow (for example another EACS, or an EOC), or the end of the message.

One or more EACS of this form may be sent in the message. On receipt of such a message, the pager will prompt the user to select an answer. There is also an additional implicit EACS. It shall not be sent by the paging system, but can be selected by the user as a response if desired. This shall be:

"None of these" For example a message may be:

Can you meet me at McDonalds tonight?<1E$_h$>R6pm<1E$_h$>R7pm <1E$_h$>R8pm <1E$_h$>RNo<1E$_h$>RI will call you later.

On receipt of such a message, the pager will prompt the user to select an answer from:

6pm

7pm

8pm

No

I will call you later

None of these

In the second form, canned answers that have been pre-stored in a pager may be used. Only one EACS may be sent in the message with the following format:

<1E$_h$>'rx' where x is a single hexadecimal digit between '0' and '9', 'A' and 'F' inclusive.

This identifies one of 16 canned answer dictionaries in the pager. Note that dictionaries can be of any length up to 256 entries. Canned answer dictionaries are optional, and as many as required are defined by the operator.

The command in this form does not require a delimiter as its length is known.

The Restore Default Allocation Control Sequence RDACS is used to restore the default feedback masks, initialisers, and phases used by the pager. It may be sent in both personal messages and group messages. This command removes the effects of the PPFACS, PSACS and PPACS.

The RDACS may be sent at any time, but must be sent in a message that contains the RACS. This enables the paging system to determine if the RDACS was received correctly.

The RDACS has the following format:

<1E$_h$>'D' and has no parameters. This command does not require a delimiter as the length of the RDACS is known.

The End of Command (EOC) control sequence may be sent in any message as a delimiter to mark the end of a Control Sequence if required. Note that any other control character or the end of message also mark the end of a control sequence.

The EOC has the following format:

<1$_h$>'E' and has no parameters.

The Temporary Sequence Allocation Control Sequence TSACS may be sent in both personal messages and group messages. The TSACS may only be sent in the same message as the RACS that does not contain the [Code] parameter, and applies only to responses for that message.

The TSACS has the following format:

<1E$_h$>'x'[Init b][Init c]

| | |
|---|---|
| [Init b] | Contains one character. The least significant 6 bits define the 'b' 6 bit initialiser. Bit 7 is ignored and may have any value. |
| [Init c] | Contains two characters. The least significant 6 bits of each character together define the 'c' 12 bit initialiser. The first of the two characters contain the most significant 6 bits, the second the least significant. In both characters bit 7 is ignored and may have any value. |

Note that if the TSACS is sent as a group call both the sequence and phase are temporarily adjusted as will be described later.

The Temporary Phase Allocation Control Sequence TPACS may only be sent to the unique RIC of a pager, and may not be sent as a group call. It is used to override the default phase used by the pager. The TPACS may only be sent in the same message as the RACS that does not contain the [Code] parameter, and only applies to responses to that message.

The TPACS has the following format:

<1E$_h$>'z'[Phase]

| | |
|---|---|
| [Phase] | Contains two characters. The least significant 6 bits of each character together define a 12 bit number between 0 and 4095. The first of the two characters contain the most significant 6 bits, the second the least significant. In both characters bit 7 is ignored and may have any value. |

The phase of a sequence that a pager uses shall be [Phase]. The use of this parameter will be described later in connection with Table 2.

This command does not require a delimiter as the length of the TPACS is known.

The Transmit Enable/Inhibit Command Sequence (TEICS) may be sent to inhibit or to enable a pager transmitting. The TEICS has the following format:

<1E$_h$>'A' Disable

<1E$_h$>'a' Enable

This command changes the Transmit parameter in the pager. If enabled, pagers may transmit. If disabled pagers may not transmit, and may only function as a one way pager.

This command does not require a delimiter as the length of the TEICS is known.

The Permanent P.N. Family Allocation Control Sequence (PPFACS) may only be sent to the unique RIC of a pager, and may not be sent as a group call. It is used to override the default XOR feedback masks used by the sequence generator.

The PPFACS may only be sent in the same message as the RACS that does not contain the [Code] parameter, and applies to that and all subsequent messages.

All pagers in a paging system shall use the same family. This command must be sent to a roaming pagers that use a different default family.

The PPFACS has the following format:

<1E$_h$>'P'[Mask h$_a$][Mask h$_b$][Mask h$_c$]

| | |
|---|---|
| [Mask h$_a$] | Contains two characters. The least significant 6 bits of each character together define the 'h$_a$' 12 bit feedback mask 108 (see FIG. 8). The first of the two characters contain the most significant 6 bits, the second the least significant. In both characters bit 7 is ignored and may have any value. |
| [Mask h$_b$] | Contains one character. The least significant 6 bits define the 'h$_b$' 6 bit feedback mask 112 (FIG. 8). Bit 7 is ignored and may have any value. |
| [Mask h$_c$] | Contains two characters. The least significant 6 bits of each character together define the 'h$_c$' 12 bit feedback mask 110 (FIG. 8). The first of the two characters contain the most significant 6 bits, the second the least significant. In both characters bit 7 is ignored and may have any value. |

This command does not require a delimiter as the length of the PPFACS is known.

The Temporary P.N.Family Allocation Control Sequence TPFACS may only be sent to the unique RIC of a pager, and may not be sent as a group call. It is used to override the default XOR feedback masks used by the sequence generator, The TPFACS may only be sent in the same message as the RACS that does not contain the [Code] parameter, and applies only to responses for that message.

The TPFACS has the following format:

<1E$_h$>'Q'[Mask h$_a$][Mask h$_b$][Mask h$_c$]

where parameters are as described above for the PPFACS. This command does not require a delimiter as the length of the TPFACS is known.

The Permanent Sequence Allocation Control Sequence PSACS may only be sent to the unique RIC of a pager, and may not be sent as a group call. It is used to override the default sequence registers used by the pager. The PSACS may only be sent in the same message as the RACS that does not contain the [Code] parameter, and applies to that and all subsequent messages.

The PSACS has the following format:

<1E$_h$>'W'[Init b][Init c]

where parameters are as described above for the TSACS.

This command does not require a delimiter as the length of the PSACS is known.

The Permanent Phase Allocation Control Sequence PPACS may only be sent to the unique RIC of a pager, and may not be sent as a group call. It is used to override the default phase used by the pager. The PPACS may only be sent in the same message as the RACS that does not contain the [Code] parameter, and applies to that and all subsequent messages.

The PPACS has the following format:

<1E$_h$>'Y'[Phase]

| | |
|---|---|
| [Phase] | Contains two characters. The least significant 6 bits of each character together define a 12 bit number between 0 and 4095. The first of the two characters contain the most significant 6 bits, the second the least significant. In both characters bit 7 is ignored and may have any value. |

This command does not require a delimiter as the length of the PPACS is known.

The Phase Step Definition Sequence PSDCS defines the phase step between permitted codes. It would typically be used to reprogram roaming pagers.

The PSDCS has the following format:

<1E$_h$>'S'[Phase Step]

where

| | |
|---|---|
| [Phase Step] | Contains one character that may have any value. The least significant 6 bits define the Phase Step to be used by the pager. Bit 7 is ignored and may have any value. |

This command does not require a delimiter as the length of the PSDCS is known.

In some cases there may be a requirement to send a control character as a character in part of a message to be displayed to the user. In such cases an escape control character is defined by the operator.

In the embodiments of the present invention two way pagers do not use tone calls. Instead paging calls where a single address codeword is used shall be interpreted as an acknowledgement to a transmission by a pager. They are an alternative to using the REC parameter in the Invitation Control Sequence ICS.

For POCSAG pagers, the function bits used in the address codeword, that is bits 20 and 21, identify the ICS to which the pager responded. The function bits match the two least significant bits of the ICS [RefICS] parameter.

The use of such calls is optional.

The use of the previously described command sequences in a paging system and how a pager should respond to the command sequences to implement two way paging will now be described.

The following applies:

Two types of transmission may be sent by pagers:

| | |
|---|---|
| i) Solicited | These are expected transmissions made by pagers as a result of a message. |
| ii) Unsolicited | These are unexpected transmissions made by pagers - for example when registering roaming, or when the user is requesting information. |

Pagers can only transmit a response after an Invitation Control Sequence ICS or a Fast Invitation Control Sequence FICS has been received. The parameters in the control sequences are used to determine if and what type of responses are permitted. Except when inviting unsolicited responses, the ICS is used in conjunction with the RACS. The FICS is used on its own.

Pagers may transmit one of several codes in response to a message. The meanings of different codes are defined later.

Answerback codes fall into one of three categories:

| | |
|---|---|
| i) Default | These have already been defined in connection with the description of FIGS. 8 and 9 |
| ii) Permanent | On occasion, pagers may be instructed to use different answerback codes for responses to messages. Such instructions are typically given to roaming pagers. The RDACS causes pagers to resume use of Default codes. |
| iii) Temporary | Messages may include answerback codes to be used by pagers for that message only. Subsequent responses to messages use Default or Permanent Codes. |

Operators may use one of two basic strategies:
1) Invite pagers to respond immediately to a message. This is achieved by sending the ICS and RACS in the same message, or by sending the FICS. In general only a few pagers would transmit responses at the same time.
2) Invite pagers to respond together. This is achieved by sending the RACS in individual messages, and then by sending the ICS as a group call. This technique is required if the same frequency is to be used for uplink and downlink transmissions.

A total of $2^{18}$ sequences are available for use by pagers to transmit responses to messages. Depending on the Phase Step, up to 512 codes are available per sequence. This means that up to $2^{27}$ codes are available for use.

These codes can be used for one of two purposes—as reserved codes for individual pagers, or as spare codes for general use.

The constant [N] and parameter [Phase Step] (as described previously in connection with code generation) provide a number of options. For Phase Step values of 8 and 16, these are as shown in Table 2.

TABLE 2

Phases and Sequences

| N | Phase Step | Numbers of Pagers per Sequence | Number of Phases per Pager | Number of Spare Sequences |
|---|---|---|---|---|
| 3 | 8 | 8 | 64 | 0 |
| 3 | 16 | 8 | 32 | 0 |
| 4 | 8 | 16 | 32 | 131072 |
| 4 | 16 | 16 | 16 | 131072 |
| 5 | 8 | 32 | 16 | 196608 |
| 5 | 16 | 32 | 8 | 196608 |
| 6 | 8 | 64 | 8 | 229376 |
| 6 | 16 | 64 | 4 | 229376 |
| 7 | 8 | 128 | 4 | 245760 |

Command Sequences defined previously enable codes (both sequences and phases) to be allocated on a message by message basis. Three strategies are available:
1) Never use sequence or phase re-allocation and have no spare sequences. This strategy means that only one two-way message may be sent to a pager at a time.
2) Use phase re-allocation only. In this case a set number of pagers would share the Phases of their given sequence. For example if [N] is 4 and [Phase Step] is 8, 16 pagers would share all 256 phases of the same sequence.
3) Always use both sequence and phase re-allocation. In this case [N] should be set to a higher number and the Spare Sequences should always be used for messages.

Various hybrids could be used. Note that if roaming is to be supported, roaming pagers may need to have their [Phase Step] parameter reprogrammed.

A pager may transmit one of a number of sequences which each have a different meaning. To limit base-station processing, the ICS can restrict the transmission from pagers to a sub-set by appropriate use of the [Type] parameters in both the ICS and RACS.

Transmissions which are solicited by a paging network controller include:

ACK: Acknowledgement. This informs the paging network controller that the message was received correctly.

DISP: Displayed. This informs the paging network controller that the message was received correctly and displayed to the user.

ANR: Answer Ready. This informs the paging network controller that a user answer to the message is ready.

FLG: Any answer Ready. This informs the paging network controller that a user answer to any message is ready.

ANSn: An actual answer to the message, where n is a number. Unsolicited transmissions comprise:

REG: Registration.

DAT: Data, where higher uplink data rates are used.

The pseudo-random data sequence to be used by a pager is defined above in connection with the description of FIGS.

8 and 9. However it can be changed by receipt of commands defined in Table 1.

A pager shall use Answerback Phases as follows:

| Phase | ACK or REG | Message Acknowledgement or Registration |
|---|---|---|
| Phase + Phase Step | DISP | Message Displayed |
| Phase + 2 × Phase Step | ANR or FLG | Answer Ready |
| Phase + 3 × Phase Step | ANS0 | 'None of These' |
| Phase + 4 × Phase Step | ANS1 | User Answer 1 |
| Phase + 5 × Phase Step | ANS2 | User Answer 2 |
| Phase + (N − 3) × Phase Step | ANSN | User Answer N | where the default Phase of a pager and the Phase Step are as defined previously. The Phase Step can be changed by commands defined in Table 1. The following constraints apply:

REG and FLG responses may not be sent on a temporary Sequence or Phase.

If more than one message is sent to a pager that requires responses, then the RACS [Code] parameter, or TSACS and TPACS should be used.

If a pager has responses ready for more than one message, the response to the oldest message should be given. The exception is when fragmented messages are sent and other rules apply.

The following rules must be used to determine if a response is permitted to be sent by the pager. Reference is made to the ICS, RACS, and the FICS. If Progressive Elimination is to be used, then the rules defined later in connection with a discussion of Progressive Elimination also apply.

Acknowledgements responses ACK to a message may only be sent if the following conditions apply:
Either all of the following:
The RACS [Type] parameter permits acknowledgements.
The ICS [Type] parameter permits acknowledgements.
The RACS [RefRACS] and ICS [RefICS] parameter are identical.
The ICS is the first ICS received after the RACS.
Or:
A FICS is sent.
In addition the following apply:
The message has been received and all errors corrected.
The message is less than a day old.

DISP responses to a message may only be sent if all the following conditions apply:
The message has been displayed to the user. Note that this is a pager dependent function.
The RACS [Type] parameter permits displayed responses.
The ICS [Type] parameter permits displayed responses.
The RACS [Time] parameter is greater than the ICS [Time] parameter.
The message is less than 16 days old.
If a previous DISP transmission for the message has been sent and not acknowledged.
No more than [R] DISP transmissions have been made to the message.

where [R] is defined by the operator. For example if R is 3, then only 3 DISP transmissions may be made to a message, not counting re-transmissions due to Progressive Elimination.

The ANR, FLG and ANSn responses are used to convey user answers to a message. Their use is as follows:
ANR: A user answer is ready to be transmitted. This type of response enables an operator to determine if answers are ready before searching for them, reducing processing loads.
FLG: This response is only used if more than one message has been sent to a pager that have answers. It indicates that an answer is ready to any outstanding message.
ANSn: This is an actual answer to a message.

This enables one of three strategies to be used:
1) Request ANR responses, then request ANSn responses. This should be used when a high number of responses are anticipated.
2) Request FLG responses, then request ANSn responses.
3) Just request ANSn responses. This should be used when the number of expected responses is low.

ANR responses to a message may only be sent if all the following conditions apply:
The user has an answer to the message. Note that this is a pager dependent function.
The RACS [Type] parameter permits user answer responses.
The ICS [Type] parameter permits specific user answer ready responses.
The RACS [Time] parameter is greater than the ICS [Time] parameter.
The message is less than 16 days old.
No more than [R] ANR transmissions have been made to the message.

FLG responses may only be sent if all the following conditions apply:
The user has an answer to any message. Note that this is a pager dependent function.
The RACS [Type] parameter permits user answer responses.
The ICS [Type] parameter permits general user answer ready responses.
The RACS [Time] parameter is greater than the ICS [Time] parameter.
The message is less than 16 days old.
No more than [R] FLG transmissions have been made to the message.

ANSn responses to a message may only be sent if all the following conditions apply:
The user has selected that answer to the message. Note that this is a pager dependent function.
The RACS [Type] parameter permits user answer responses.
The ICS [Type] parameter permits user answer responses.
The RACS [Time] parameter is greater than the ICS [Time] parameter.
The message is less than 16 days old.
No more than [R] ANSn transmissions have been made to the message.

where [R] is the same as for DISP responses.

Registration responses REG may only be sent if the following conditions apply:
There is a need to send a REG command. (This is application dependent.) The ICS [Type] parameter indicates Unsolicited Responses (bit 5 is clear).
The URN defined in the ICS [Type] parameter is less than or equal to 18 ($<52_h>$).
The Answerback Code used by the pager for registration shall be the default code described in connection with the description of FIGS. 8 and 9, or the permanent code is modified by commands in Table 1. This code is further modified as follows:

The URN defines a mask that shall be applied to b and c shift registers 118 and 116, respectively, of the sequence generator (FIG. 8). The mask shall be ANDed with the values in the shift registers and the result stored in shift registers 118 and 116.

| URN | Shift Register b Mask MSB   LSB | Shift Register c Mask MSB   LSB |
|---|---|---|
| 0 | 111111 | 111111111111 |
| 1 | 111111 | 111111111110 |
| 2 | 111111 | 111111111100 |
| 3 | 111111 | 111111111000 |
| 4 | 111111 | 111111110000 |
| 5 | 111111 | 111111100000 |
| 6 | 111111 | 111111000000 |
| 7 | 111111 | 111110000000 |
| 8 | 111111 | 111100000000 |
| 9 | 111111 | 111000000000 |
| 10 | 111111 | 110000000000 |
| 11 | 111111 | 100000000000 |
| 12 | 111111 | 000000000000 |
| 13 | 111110 | 000000000000 |
| 14 | 111100 | 000000000000 |
| 15 | 111000 | 000000000000 |
| 16 | 110000 | 000000000000 |
| 17 | 100000 | 000000000000 |
| 18 | 000000 | 000000000000 |

The Phase used by the pager remains unmodified. Note that if the URN is 0, then the sequence also remains unmodified.

The use of the URN enables the operator to identify pagers wishing to register on an iterative basis. This prevents base stations having to look for many thousands of answer-back codes.

Two way messaging is not limited to personal calls. For two way calls to a group of pagers two techniques are available:
1) Use Default or Permanent Codes
2) Use Temporary Codes.

Group Calls using default or permanent codes is the simplest mechanism for sending group two-way messages. The following apply:

Group calls are received on a common RIC that is shared by other pagers.

Temporary codes are not defined in the message.

Pagers respond to group two-way calls as with personal calls.

The pager does not need to know the difference between Group RICs and Personal RICs, and each pager responds with its unique code.

Note that there are two limitations with this technique:
i) Only one such two way call may be sent at a time.
ii) The number of codes available for answers is limited.

Group calls using temporary codes is a more complex mechanism for sending group calls, but it overcomes the limitations when default or permanent codes are used. The following apply:

Each pager must have a common RIC with Group Call ID enabled and each pager must have a unique sub-address [2]. Group calls are defined as those where at least one wild card character is used.

All group calls shall include a temporary sequence and phase either using the [Code] parameter of the RACS or by using the TSACS and TPACS commands.

The Phase used by a pager shall be:
$\{[\text{Phase Step}] \times [C_N] \times [\text{sub-address}+\text{Phase}]\} \bmod 2^{12}$ The Sequence used by the pager shall be: $([\text{Init b}][\text{Init c}] + ([\text{Phase Step}] \times [C_N] \times [\text{sub-address}+\text{Phase}]) \text{DIV } 2^{12}) \bmod 2^{18}$ where [Phase Step] is as described previously, and [Init b][Init c] and [Phase] is as defined in the [Code] parameter of the RACS, or as in the TSACS and TPACS.

$[C_N]$ defines the number of possible responses to the message and can be calculated as follows:

If the RACS [Type] parameter permits ACKs, $r_{ack}=1$, else $r_{ack}=0$.

If the RACS [Type] parameter permits DISPs, $r_{disp}=1$, else $r_{disp}=0$.

If the RACS [Type] parameter permits ANRs, $r_{anr}=1$, else $r_{anr}=0$.

If $r_{anr}=1$; if canned dictionary is used, $r_{ans}=256$ else $r_{ans}=1+$Number of possible answers.

If $r_{anr}=0$; $r_{ans}=0$.

$C_N = r_{ack} + r_{disp} + r_{anr} + r_{ans}$

Progressive Elimination is particularly applicable if receiver sites are likely to suffer from the near-far problem associated with CDMA transmissions. If in a distributed paging system with many receiver sites this problem is considered insignificant, then this technique is optional.

If Progressive Elimination is not to be used, the ICS [Slot] parameter shall always be 0.

Progressive Elimination is implemented as follows:
Several ICSs are sent as a series.
All pagers respond to the first ICS.
A second ICS is then transmitted that includes the [REC] parameter. This informs pagers if their response was or was not received.

Only pagers that have not had their response received re-transmit in response to the second ICS.

A third and subsequent ICS may be sent that each include the [REC] parameter.

Typically, the [Length] parameter is set to a low value for the first ICS, and increased in subsequent ICSs in the series.

At the end of the Answerback series, there may be some pagers that have still not had their responses detected by the paging system. In such cases the paging system may retransmit the original message. The operator may specify a maximum number of times that a message should be transmitted.

In order to prevent pagers being confused between different series, the [RefICS] and [Slot] parameters in the ICS are used as follows:

The [RefICS] parameter is the same for each series and is increased by one for the next series. If [RefICS] reaches $<7F_h>$ it shall be reset to $<20_h>$.

The Slot parameter is 0 for the first ICS of a series, and increased by 1 for each ICS of the series. It resets to 0 only when the {RefICS] parameter increases.

The [REC] parameter is only present when [Slot] is non zero.

| For example a series may be: | $<7E_h><30_h>$, $<7E_h><31_h>$, $<7E_h><32_h>$, $<7E_h><33_h>$. |
|---|---|
| The next series will then be: | $<20_h><30_h>$, $<20_h><31_h>$, $<20_h><32_h>$, $<20_h><33_h>$ |
| The next: | $<21_h><30_h>$, $<21_h><31_h>$ $<21_h><32_h>$, $<21_h><33_h>$. | etc.

The ICS [REC] parameter is used in conjunction with the RACS [ARB] parameter, and they are used to implement Progressive Elimination.

It is used by pagers who sent a transmission in the previous ICS of a Progressive Elimination series to determine if their transmission was received. It contains a variable number of bits that identify pagers whose response was received, where one bit identifies a pager.

Pagers determine which bit that they are associated with as follows:

For calls to single pagers, the bit number is uniquely defined from the [ARB] parameter in the RACS counting from 0. (For example where [ARB] is 5, this corresponds to the sixth bit.)

For calls to a group of pagers, the bit number is the pager number in the group +$n_1 n_2$, defined in the [ARBI parameter in the RACS.

The following rules apply:

If the bit is set to 1, then the pager is required to send a response.

If the bit is set to 0, a previous response was received and retransmission is not required.

If the ICS [Slot] parameter is 0, (there is no [REC] parameter), then the pager is required to send a response.

The ICS [REC] parameter may finish early and contain less bits than expected. Bits truncated from [REC] shall have an assumed value of 0.

The [ARB] value may have a time limit. This enables it to be re-used for other pagers in later transmissions. If a time limit is set (the RACS [TimeARB] parameter exists) then Progressive Elimination may only be used up to the time specified.

Note that if a time limit is not specified, the [ARB] value applies to all Progressive Elimination sequences for responses to the message.

A description will now be given on how the Control Sequences and pager responses may be used.

In order to facilitate understanding of these various uses Progressive Elimination will not be considered.

Figure 12:
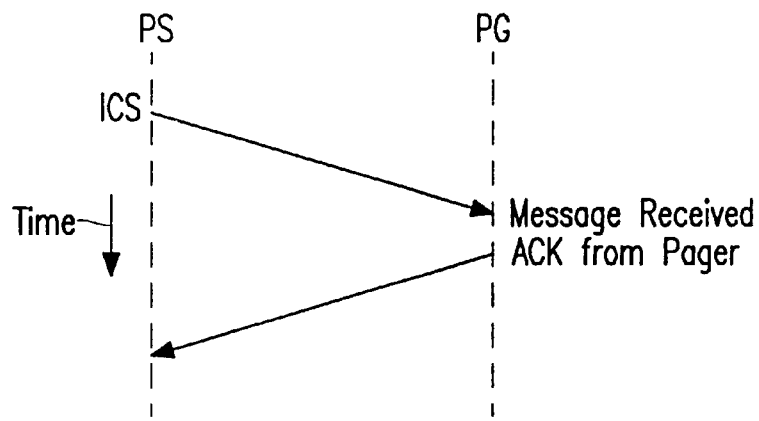
FIG. 12 is a timing diagram illustrating the transmission of an invitation control sequence by the paging system and the transmission of an knowledgement by a pager.

FIG. 12 is a timing diagram showing the paging system PS transmitting an invitation control sequence ICS, the message being received by an individual pager PG which transmits an acknowledgement ACK.

If the ACK is not received, the paging system may continue to repeat the message as determined by the operator.

There are instances when the paging system wants to be informed when the message is displayed to the user. This is shown in FIG. 12. In some cases both ACK and DISP responses may be made by a pager—such as when a pager user does not immediately look at a message. In other cases, just the DISP response is sufficient.

Figure 13:
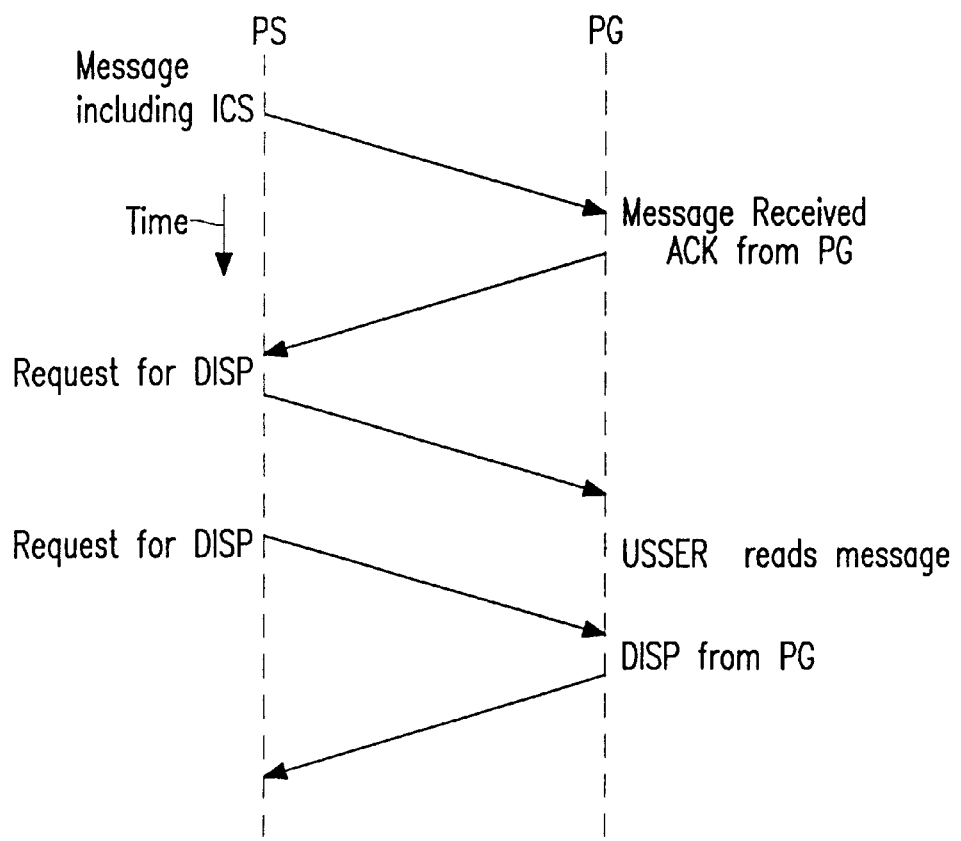
FIG. 13 is a timing diagram associated with the paging system obtaining confirmation that the uses of a pager has displayed a message.

As shown in FIG. 13, an ACK is sent by the pager PG in response to a message including ICS. The paging system PS requests to be informed when the message has been displayed to the user by sending a "Request for DISP" message, which may have to be repeated. Once the user has read the message; the pager transmits DISP.

Note that 'Request for DISP' means that an ICS is sent where the [Type] parameter has bits 1 and 5 set. The ICS may be sent in a personal or group message.

In the case of messages requiring an answer the ANR, FLG, and ANSn responses are used to convey user answers to a message.

This enables one of three strategies to be used:

1) Request ANR responses, then request ANSn responses.
2) Request FLG responses, then request ANSn responses.
3) Just request ANSn responses.

In order to minimise processing at the paging network controller PNC, user answers to a message are given in two responses. In the first response, the pager sends a 'ANR' indicating to the PNC that an answer is available. The PNC then sends another ICS to the pager requesting the answer. In response the pager sends the user answer to the message.

The PNC has to then search for all possible answers for that message.

The signalling sequence between the paging system PS and the pager PG is shown in FIG. 13.

Briefly, the paging system sends a message, including RACS and ICS, to the pager. The pager acknowledges receipt by sending ACK. The paging system requests an answer by transmitting ANR, which is repeated after a time interval during which the user reads the message and gives an answer. The answer ANR is transmitted and in response to its receipt the paging system sends a request for ANSn, which is responded to by the pager.

Note that 'Request for ANR' means that an ICS is sent where the [Type] parameter has bits 2 and 5 set. 'Request for ANSn' means that an ICS is sent where the [Type] parameter has bits 4 and 5 set.

An alternative method to minimise processing at the paging network controller PNC requires the pager when sending its first response to send a 'FLG' indicating to the paging network controller that an answer to any message is available. The base station then sends another ICS to the pager requesting the answer. In response the pager sends the user answer to the message. This is shown in FIG. 15 which in many respects is similar to FIG. 14 except that instead of the paging system sending "Request for ANR" and the pager sending "ANR", the paging system sends "Request for FLG" and the pager sends "FLG".

The base station has to then search for all possible answers for all previous messages.

Note that 'Request for FLG' means that an ICS is sent where the [Type] parameter has bits 2 and 5 set. 'Request for ANSn' means that an ICS is sent where the (Type] parameter has bits 4 and 5 set.

Figure 14:
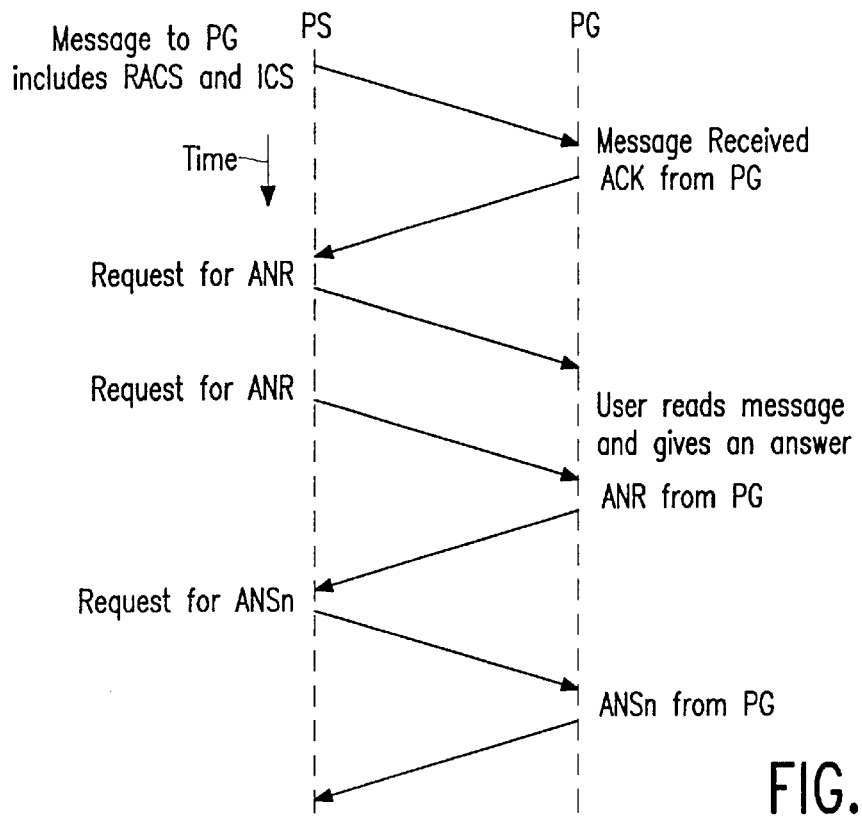
FIGS. 14 and 15 are timing diagrams associated with the paging system obtaining an answer from a pager user.
Figure 15:
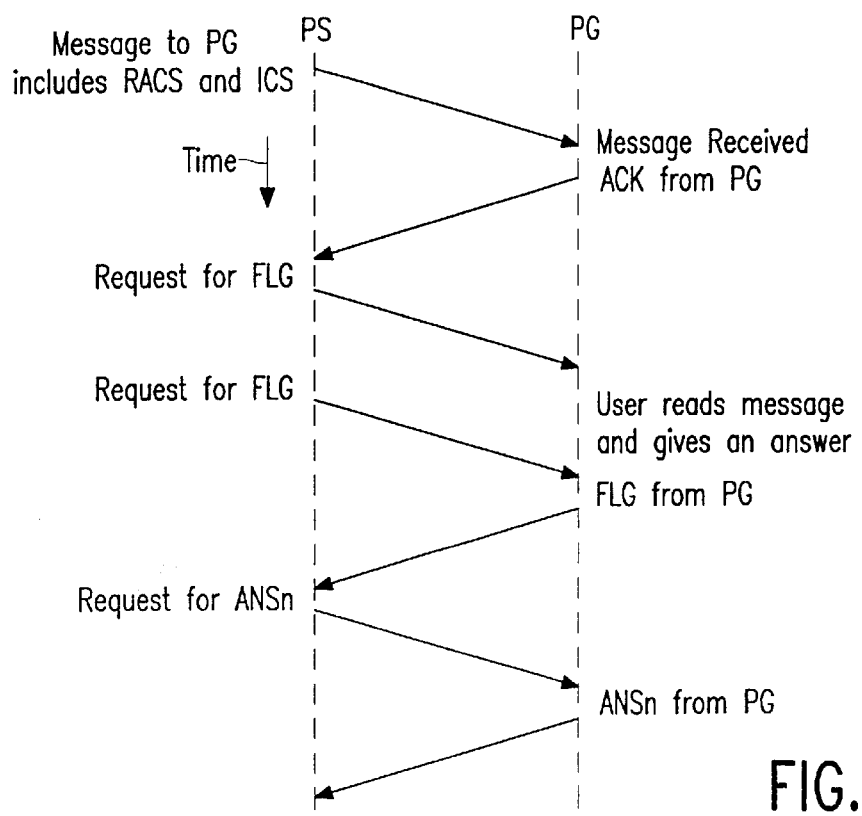

If the number of responses from pagers is low, the paging network controller may request answers directly without sending an ANR or FLG request in the ICS as shown in FIGS. 14 and 15. Instead the paging system sends "Request for ANSn" to which the pager responds by sending ANSn.

Note that 'Request for ANSn' means that an ICS is sent where the [Type] parameter has bits 4 and 5 set.

The base station has to search for all possible answers from all pagers for all previous messages.

Registration enables pagers to register onto a paging system. There are two uses for this—the first is to inform the paging system the location of the pager. The second is so that a service can be requested. The following serves as an example:

User requests service by a registration call with flag bit set. This request may be sent in response to the paging system issuing a global ICS, requesting unsolicited responses.

Message to pager includes EACS describing services available.

User selects response (e.g. traffic news)

Message to pager providing information.

Sending long messages as a series of fragments is Automatic ReQuest ARQ protocols can be applied. For example one ACK can be used to acknowledge receipt of several fragments. Rules for sending two-way fragmented messages shall be as follows:

i. All but the last fragment may be sent as a one-way or two-way message. The last fragment must be a two-way message.

ii. Acknowledgement of a two-way fragment shall be interpreted as meaning that all fragments up to and including that fragment are received successfully.

iii. All but the last two-way fragment shall only use ACK responses. The last fragment may use ACK, DISP, ANR, FLG and ANSn responses, which apply to the whole message.

iv. For fragmented messages with embedded answers, the numbering of the answers and enabling the user to select a response shall be permitted only after all fragments have been successfully received and the message reconstructed.

Operators may use these rules to implement several ARQ schemes without the pager requiring to know which protocol is being used. The following sub-sections describe how some standard ARQ schemes could be implemented.

In the case of requesting one ARQ for the whole message, the paging system sends all but the last fragment as a one-way message. Successful acknowledgement of the last fragment means that all the other fragments were received successfully.

If the message is not acknowledged, then the whole message will need to be re-transmitted. However note that it should be possible for a pager to rebuild a message from fragments of different transmissions. This is a very simple although inefficient scheme—the main purpose of which is to reduce system message delays for other users.

An alternative approach is termed stop and wait in which each fragment is sent as a two-way message. The paging system waits for successful acknowledgement before sending the next fragment.

In another approach each fragment is sent as a two-way message without waiting for successful acknowledgement of the previous fragment. Each fragment will require a different Answerback Code. If after prompting the pager does not acknowledge the latest fragment, the system shall re-transmit all fragments after that which was acknowledged.

In a further approach each fragment is sent as a two-way message without waiting for successful acknowledgement of the previous fragment. Each fragment will require a different Answerback Code. If after prompting the pager does not acknowledge the latest fragment, the system shall re-transmit only the one fragment after that which was acknowledged.

Combinations of these different approaches may be used. For example the stop and wait may be combined with the single ARQ, where every Nth fragment is a two-way message.

From reading the present disclosure, other modifications will be apparent to persons skilled in the art. Such modifications may involve other features which are already known in the design, manufacture and use of message transmission systems or component parts thereof and which may be used instead of or in addition to features already described herein.

We claim:

1. A method of operating a message transmission system comprising at least one primary station making transmissions on a down-link of messages and a plurality of secondary stations making transmissions on an up-link, each of the secondary stations having its own address which is transmitted on the down-link by the primary station as part of the message, wherein the transmissions on the up-link comprise pseudo-random data sequences, each pseudo-random data sequence being generated by supplying at least the address assigned to the secondary station to an n-bit sequence generator.

2. A message transmission system comprising at least one primary station having means for making transmissions on a down-link of messages and a plurality of secondary stations having means for making transmissions on an up-link, each of the secondary stations having its own address which is transmitted on the downlink as part of the message, wherein said means in said secondary stations for making transmissions generates responses to messages, and comprises an n-bit sequence generator for generating pseudo-random data sequences and means for supplying at least the address assigned to the secondary station to the n-bit generator for use in generating the pseudo-random sequence.

3. A system as claimed in claim 2, wherein said means in said secondary stations for makinu transmissions further selects the pseudo-random data sequence on the basis of the nature of the type of response.

4. A system as claimed in claim 2, wherein said means in said primary station for making transmissions sends a group message addressed to a plurality of said secondary stations and said means in the addressed secondary stations for making transmissions generates a unique pseudo-random data sequence as a response.

5. A system as claimed in claim 2, wherein at least one of the secondary stations has storage means for storing a plurality of received messages and said means in the at least one of the secondary stations for making transmissions generates a unique response to each of said plurality of messages.

6. A system as claimed in claim 2, wherein the primary station has means for fragmenting a long data message and the transmission means in the secondary station receiving said fragments sends a pseudo-random data sequence after at least the last fragment received.

7. A system as claimed in claim 6, wherein said transmission means in the secondary station sends a pseudo-random data sequence in response to the successful receipt of each fragment.

8. A system as claimed in claim 2, wherein the primary station has means for inviting said secondary stations to transmit their responses, and for repeating the invitation and, insodoing, acknowledging receipt of those responses received successfully, and wherein those of said secondary stations receiving an acknowledgement to their response refrain from responding to the repeated invitation.

9. A secondary station for use in a message transmission system in which at least one primary station transmits messages on a down-link to addressed secondary stations having at least one uniqlue address, the secondary station having means for making transmissions on an up-link, wherein said means in said secondary stations for making transmissions generates a pseudo-random data sequence in response to a received message, and comprises an n-bit sequence generator for generating a pseudo-random data sequence and means for supplying at least the address assigned to the secondary station to the n-bit sequence generator for use in generating the pseudo-random sequence.

10. A secondary station as claimed in claim 9, wherein in response to a primary station sending a group message, said means in the secondary station for making transmissions generates a unique pseudo-random data sequence as a response.

11. A secondary station as claimed in claim 10, further comprising storage means for storing a plurality of received messages and wherein said means in the secondary station for making transmissions generates a unique response to each of said plurality of messages.

12. A secondary station as claimed in claim 9, wherein in response to receiving a fragmented long data message the means in the secondary station for making transmissions sends a pseudo-random data sequence after at least the last fragment received.

13. A secondary station for use in a message transmission system in which at least one primary station transmits messages on a down-link to addressed secondary stations, the secondary station having means for storing a plurality of received messages and means for generating a unique response to each of said messages stored in said storage means for transmission on an up-link, wherein said response generating means in said secondary stations includes means for generating a pseudo-random data sequence in response to a received message, the pseudo-random data sequence being generated at any one time being dependent on at least the address assigned to the secondary station and/or information contained in the message.

* * * * *